United States Patent Office 2,755,273
Patented July 17, 1956

2,755,273

POLYESTERS FROM HYDROXYALKYL ETHERS OF VANILLIC ACID AND ESTERS THEREOF

Louis H. Bock, Shelton, Wash., assignor to Rayonier Incorporated, Shelton, Wash., a corporation of Delaware No Drawing. Original application July 24, 1951, Serial No. 238,390, now Patent No. 2,686,198, dated August 10, 1954. Divided and this application January 21, 1953, Serial No. 332,573

4 Claims. (Cl. 260—47)

This invention relates to organic compounds and synthetic linear condensation polymers, and has for its object the provision of a new class of organic compounds and linear condensation polymers produced therefrom and a method of making the polymers. This application is a division of my copending application Serial Number 238,-390, filed July 24, 1951, and now Patent No. 2,686,198.

The new compounds of the invention have general utility and are particularly useful in forming the linear condensation polymers of the invention which are suitable for the formation of filaments, films, or molded objects. The invention provides linear polymers having a high degree of chemical stability, relatively high melting point, and low solubility in common organic solvents. The new class of compounds for forming the linear polymers of the invention can be prepared advantageously from readily available raw material.

The compounds of the invention are hydroxy acids represented by the formula

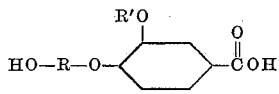

in which R is one of the divalent aliphatic groups consisting of —CH₂CH₂— and —CH₂CH₂CH₂— and R' is one of the radicals consisting of CH₃— and C₂H₅—, and their methyl, ethyl, and butyl esters.

One of the most advantageous specific compounds of the invention is the hydroxy acid represented by the formula

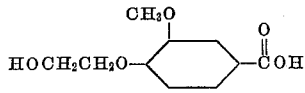

This compound is important because on condensation it produces a linear polyester of relatively high melting point and may be prepared from vanillic acid by reaction of the sodium salt with ethylene oxide according to the following equation:

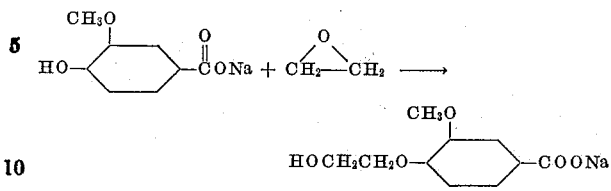

Vanillic acid is obtainable by the alkaline oxidation of sulfite waste liquor which is a by-product in the manufacture of cellulose from wood. Sulfite waste liquor is produced in great quantity and is of no economic value but is in fact a nuisance whose disposal is a serious problem to pulp and paper mills.

The compound represented by the formula

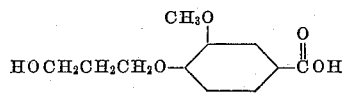

has properties similar to the aforementioned compound and also has a relatively high melting point. This compound is also advantageously prepared from vanillic acid by reacting the sodium salt thereof with trimethylene bromohydrin.

Either of the aforementioned hydroxy acids may be changed by substituting ethoxy groups for the methoxy groups.

The linear polyesters of the invention are obtained by heating the above-described free hydroxy acids to a temperature of 200–300° C. under vacuum or by heating an ester thereof to such a temperature in the presence of a transesterification catalyst such as sodium methoxide or lithium methoxide. These reactions are illustrated by the following equations:

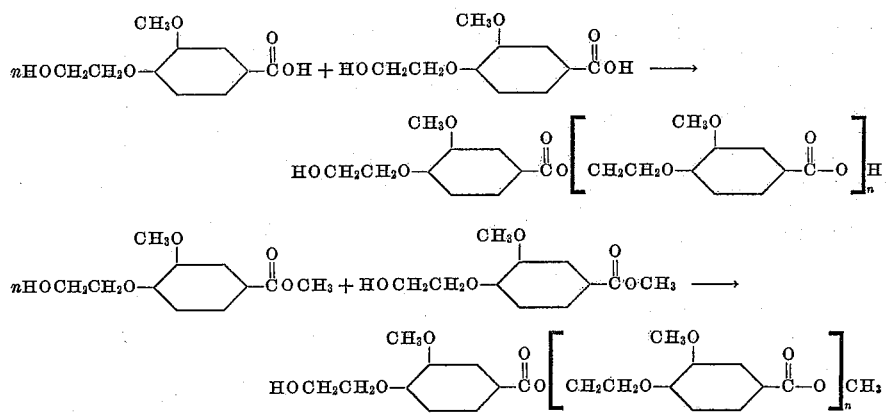

The linear polyesters of the invention are characterized by the repeating units

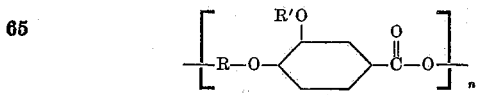

where R and R' are, as aforementioned, and n is a number over 10.

The preparation of the product of this invention is illustrated by the following examples:

Example 1
PREPARATION OF THE HYDROXYETHYL ETHER OF VANILLIC ACID

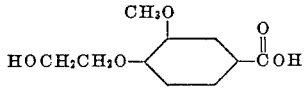

One hundred sixty-eight parts of vanillic acid was dissolved in 400 parts of water containing 46 parts of sodium hydroxide. The solution was placed in a gas tight vessel with an efficient stirring mechanism and a gas inlet tube. The mixture was stirred and heated to 75° C. and ethylene oxide was then added as a vapor through the gas inlet tube. Air was displaced by venting the system and ethylene oxide was then passed in at such a rate that the gas pressure was about 5 lbs. per sq. in. (gauge). The temperature was maintained at 75–90° C. and the reaction was continued until 46 parts of ethylene oxide had been absorbed. The reaction mixture was then heated with agitation until the pressure fell to atmospheric or below. The time required for the reaction was about 90 minutes. The reaction mixture was then cooled and saturated with sulfur dioxide. The free acid precipitated and was filtered, washed with water and dried. The yield was 169 parts of a crystalline product melting at 175–180° C.

The product was purified by vacuum sublimation and crystallization as follows: The sublimation apparatus consisted of two stainless steel beakers, one of which fitted inside the other leaving about ¾ inch of space between the two bottoms. An annular ring and rubber gasket formed a vacuumtight seal between the rims of the beakers. A short piece of ¼-inch steel pipe was welded into the upper wall of the outer beaker for attaching a vacuum line. The crude acid was placed in a layer on the bottom of the large beaker, the inner beaker was set in place and ice water was placed inside the inner beaker to serve as a condenser. The system was then evacuated to a pressure of 1–2 mm. and heated to 160–180° C. on a hot plate. After about 15 minutes the vacuum was released, the inner beaker was carefully removed and the white crystalline product was scraped from the bottom. The sublimed material was perfectly colorless but had a melting range about the same as the crude material. Further purification was effected by crystallizing from a mixture of methanol and ethyl acetate. For this 45 parts of sublimed crystals was dissolved in a mixture of 284 parts of methanol and 1000 parts of ethyl acetate. The product was obtained in the form of fine needles melting at 198–201° C. The neutralization equivalent found was 210 compared to a theoretical value of 212 for $C_{10}H_{12}O_5$.

Example 2
PREPARATION OF THE METHYL ESTER OF THE HYDROXYETHYL ETHER OF VANILLIC ACID

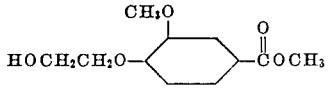

Three hundred twenty parts of the crude hydroxyethyl ether of vanillic acid as prepared in Example 1 and obtained by precipitating from the aqueous solution of its salt with sulfur dioxide was suspended in 2000 parts of methanol and dry HCl was passed in until the solid had all dissolved. The solution was then boiled under a reflux condenser for 21 hours. The excess methanol and HCl were removed by vacuum evaporation at not over 100° C. and the residue was distilled under vacuum. Two hundred eighty parts of product distilled at 142–150° C. at a pressure of 0.05 mm. The product was a clear, viscous liquid which crystallized on standing to a solid melting at 73–75° C. It was recrystallized from water to give a product melting at 76–77° C. The saponification equivalent was 227 compared to a theoretical value of 226 for $C_{11}H_{14}O_5$.

Example 3
CONDENSATION OF THE HYDROXYETHYL ETHER OF VANILLIC ACID

The condensation was carried out in a glass vessel equipped with a thermocouple well and a vacuum connection. The vessel was heated by an electric jacket. Pure hydroxyethyl ether of vanillic acid was placed in the reaction vessel which was evacuated to 12 mm. pressure. The material was then heated at 250° C. for 5½ hours during which time there was active boiling as water was liberated. Because of the tendency of the material to sublime, higher temperatures or lower pressures cannot be used during the initial stage of the condensation. After 5½ hours the temperature was raised to 280° C. and the pressure was reduced to 0.05 mm. and these conditions were maintained for 22 hours. The product was a hard brittle solid of light amber color. It melted at 230–235° C. and the molten material could be drawn into fibers. The polymer was insoluble in all common solvents but dissolved slightly in m-cresol, o-chlorophenol or ethane sulfonic acid. Viscosity measurements in o-chlorophenol indicated an intrinsic viscosity of 0.2.

Example 4
CONDENSATION OF THE HYDROXYETHYL ETHER OF VANILLIC ACID USING BORIC ACID AS A CATALYST The condensation was carried out in the apparatus described in Example 3. To 1000 parts of the hydroxyethyl ether of vanillic acid was added 0.8 part of boric acid. The mixture was heated at 220–245° C. and a pressure of 10 mm. for 3½ hours and then at 280° C. and 0.1 mm. for 24 hours. The product was a hard, brittle, cream-colored solid. It melted at 235–240° C.

Example 5
CONDENSATION OF THE METHYL ESTER OF THE HYDROXYETHYL ETHER OF VANILLIC ACID One hundred twenty-two parts of the methyl ester of the hydroxyethyl ether of vanillic acid (prepared as in Example 2) and one part of a methanol solution of lithium methoxide containing 0.01 g. of lithium were placed in the apparatus described in Example 3. The mixture was heated at 225–250° C. over a period of 8 hours during which time the pressure was gradually reduced to 16 mm. It was then heated 20 hours at 270–280° C. at a pressure of 0.05–0.10 mm. The product was a light colored opaque solid that melted at 225° C.

Example 6
PREPARATION OF THE γ-HYDROXYPROPYL ETHER OF VANILLIC ACID

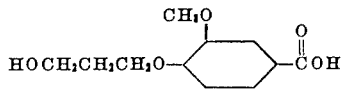

Three hundred thirty-six parts of vanillic acid was dissolved in a solution containing 162 parts of sodium hydroxide in 1000 parts of water. This solution was placed in a vessel equipped with a mechanical stirrer and a reflux condenser. Two hundred ninety-six parts of trimethylene bromohydrin was added and the mixture was stirred and heated to refluxing temperature for 4 hours. The solution was then cooled and 1000 parts of 2.26 N hydrochloric acid was added. The product precipitated, was filtered and washed with water. The crude acid so obtained was purified by vacuum sublimation at 150° C. and a pressure of 0.35 mm. The sublimed product was crystallized from methyl ethyl ketone. One hundred nine parts of pure acid was obtained which melted at 160–165° C. and had a neutralization equivalent of 220 compared to a theoretical value of 226 for an acid of the formula $C_{11}H_{14}O_5$.

Example 7

CONDENSATION OF THE γ-HYDROXYPROPYL ETHER OF VANILLIC ACID

The condensation was carried out in a glass vessel equipped with a thermocouple well and a vacuum connection. Pure γ-hydroxypropyl ether of vanillic acid was placed in the reaction vessel which was evacuated to 9 mm. pressure. The material was heated to 240° C. and the pressure was gradually reduced to 0.2 mm. The temperature was then raised to 270° C. and heating was continued for 18 hours. The polymer was a brown solid which started to melt at 80° C. and became liquid at about 150° C. The molten polymer could be drawn into filaments.

The polyester obtained by the above-described reactions can be extruded in the form of fibers or filaments, can be molded in a press, or cast from the melt. The objects so formed are characterized by being colorless, high melting and resistant to the ordinary organic solvents. The product is useful in the preparation of textile fibers, film and molded objects.

I claim:

1. Linear polyesters characterized by having a repeating structure represented by

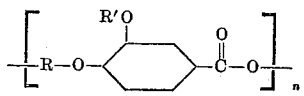

in which R is a divalent aliphatic radical of the group consisting of —$CH_2CH_2$— and —$CH_2CH_2CH_2$—, R' is a radical of the group consisting of $CH_3$— and $C_2H_5$—, and $n$ is a number over 10.

2. Linear polyesters characterized by having a repeating structure represented by

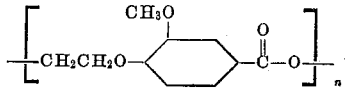

where $n$ is a number over 10.

3. A linear polyester as defined in claim 2 having an intrinsic viscosity of about 0.2.

4. The process of preparing a linear polyester by heating under vacuum a compound represented by the formula

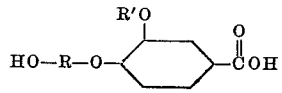

in which R is a divalent aliphatic radical of the group consisting of —$CH_2CH_2$— and —$CH_2CH_2CH_2$—, R' is a radical of the group consisting of $CH_3$— and $C_2H_5$—, and their methyl, ethyl and butyl esters.

References Cited in the file of this patent

UNITED STATES PATENTS

| | | |
|---|---|---|
| 2,471,023 | Cook | May 24, 1949 |
| 2,600,376 | Caldwell | June 17, 1952 |